(12) United States Patent
Tokushima et al.

(10) Patent No.: US 10,150,162 B2
(45) Date of Patent: Dec. 11, 2018

(54) IRON-BASED SINTERED ALLOY FOR SLIDING MEMBER AND PRODUCTION METHOD THEREFOR

(71) Applicant: HITACHI CHEMICAL COMPANY, LTD., Tokyo (JP)

(72) Inventors: Hidekazu Tokushima, Kashiwa (JP); Hideaki Kawata, Matsudo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 932 days.

(21) Appl. No.: 14/225,990

(22) Filed: Mar. 26, 2014

(65) Prior Publication Data

US 2014/0294654 A1    Oct. 2, 2014

(30) Foreign Application Priority Data

Mar. 29, 2013   (JP) .................................. 2013-071866

(51) Int. Cl.
   *B22F 5/00*   (2006.01)
   *B22F 3/12*   (2006.01)
   (Continued)

(52) U.S. Cl.
   CPC ............ *B22F 5/00* (2013.01); *C22C 33/0221* (2013.01); *C22C 33/0278* (2013.01);
   (Continued)

(58) Field of Classification Search
   CPC . C22C 38/30; C22C 33/0278; C22C 33/0221; F16C 22/128; B22F 5/00
   (Continued)

(56) References Cited

U.S. PATENT DOCUMENTS 6,086,257 A     7/2000  Lee
8,216,338 B2 *  7/2012  Shim .................... B22F 3/1146
                                                        384/279

(Continued)

FOREIGN PATENT DOCUMENTS

DE    10 2012 018 964 A1    4/2013
DE       102012013226 A1    1/2014
       (Continued)

OTHER PUBLICATIONS

Aug. 7, 2015 Office Action issued in Korean Patent Application No. 10-2014-0035408.
(Continued)

*Primary Examiner* — Colleen P Dunn
*Assistant Examiner* — Jeremy C Jones
(74) *Attorney, Agent, or Firm* — Oliff PLC

(57) ABSTRACT

An iron-based sintered alloy for sliding member, in which seizure resistance is improved, and a production method therefor, are provided. The iron-based sintered alloy for sliding member consists of, by mass %, 10 to 30% of Cu, 0.2 to 2.0 % of C, 0.03 to 0.9 % of Mn, 0.36 to 3.65% of S, and the balance of Fe and inevitable impurities in the overall composition. The iron-based sintered alloy for sliding member exhibits a metallic structure in which copper phases and pores are dispersed in the matrix that includes mainly a martensite structure and sulfide particles are dispersed in the matrix and the copper phases. The sulfide particles are dispersed at 1 to 30 vol. % with respect to the matrix.

6 Claims, 2 Drawing Sheets

(51) Int. Cl.
*C22C 33/02* (2006.01)
*C22C 38/00* (2006.01)
*F16C 33/12* (2006.01)
*F16C 33/14* (2006.01)
*C22C 38/04* (2006.01)
*C22C 38/16* (2006.01)
*C22C 38/60* (2006.01)

(52) U.S. Cl.
CPC .............. *C22C 38/00* (2013.01); *C22C 38/04* (2013.01); *C22C 38/16* (2013.01); *C22C 38/60* (2013.01); *F16C 33/128* (2013.01); *F16C 33/145* (2013.01); *B22F 2998/10* (2013.01)

(58) Field of Classification Search
USPC ..................................................... 75/230, 231
See application file for complete search history.

(56) References Cited

U.S. PATENT DOCUMENTS

| | | | | |
|---|---|---|---|---|
| 2003/0061905 A1* | 4/2003 | Wang | ................. | C22C 33/0214 75/252 |
| 2004/0112173 A1* | 6/2004 | Maulik | ............... | C22C 33/0207 75/246 |
| 2004/0182200 A1* | 9/2004 | Takiguchi | ................. | B22F 3/24 75/246 |
| 2005/0040358 A1* | 2/2005 | Chikahata | ............... | B22F 5/008 251/368 |
| 2011/0243484 A1* | 10/2011 | Lee | ........................ | C22C 38/008 384/26 |
| 2013/0084203 A1 | 4/2013 | Fukae et al. | | |
| 2013/0182979 A1* | 7/2013 | Ito | ........................ | F16C 33/104 384/107 |
| 2015/0322828 A1 | 11/2015 | Kohler et al. | | |

FOREIGN PATENT DOCUMENTS

| | | |
|---|---|---|
| JP | A-11-117940 | 4/1999 |
| JP | 2004-204298 A | 7/2004 |
| JP | A-2009-155696 | 7/2009 |
| JP | A-2013-076152 | 4/2013 |
| JP | 2014-066271 A | 4/2014 |

OTHER PUBLICATIONS

Sep. 20, 2016 Office Action issued in Japanese Patent Application No. 2013-071866.
Sep. 21, 2016 Office Action issued in German Patent Application No. 102014004450.5.

* cited by examiner

IRON-BASED SINTERED ALLOY FOR SLIDING MEMBER AND PRODUCTION METHOD THEREFOR

BACKGROUND OF THE INVENTION

Technical Field

The present invention relates to an iron-based sintered alloy for a sliding member that is suitably used for a bearing in which high surface pressure is loaded on an inner circumference surface, and relates to a production method therefor. In particular, the present invention relates to an iron-based sintered alloy for a sliding member, which improves seizure resistance.

Background Art

For example, in sliding members having sliding surfaces to be applied with high surface pressure, such as driving portions and sliding portions of vehicles, machine tools, or industrial machines, etc., a carbon steel which was cut and was quench hardened and tempered, or a sintered alloy, is used. Specifically, since the sintered alloys can have self-lubricating characteristics by lubricating oil infiltrated thereinto, they have superior seizure resistance and wear resistance and are thereby widely used. For example, a bearing is disclosed in Japanese Patent Application Laid-open Publication No. 11-117940. The bearing has a sliding surface provided with an iron-based sintered alloy layer consisting of 10 to 30 weight % of Cu and the balance of Fe.

In addition, an iron-based sintered alloy for a sliding member is disclosed in Japanese Patent Application Laid-open Publication No. 2009-155696. The iron-based sintered alloy consists of, by mass %, 0.6 to 1.2% of C, 3.5 to 9.0% of Cu, 0.6 to 2.2% of Mn, 0.4 to 1.3% of S, and the balance of Fe and inevitable impurities. The iron-based sintered alloy has a structure in which 1.0 to 3.5 mass % of a MnS phase and at least one of a free Cu phase and a free Cu—Fe alloy phase are dispersed in a martensite matrix.

In recent years, for sliding members having sliding surfaces that will be subjected to high surface pressures, further improvement of seizure resistance is required.

In view of this, in the invention disclosed in Japanese Patent Application Laid-open Publication No. 2009-155696, 1.0 to 3.5 mass % of the MnS phase is dispersed. Thus, the decrease of the wear resistance and the increase of the wear characteristics with respect to a mating member due to decrease in the amount of Cu are avoided. However, MnS powder added to a raw powder remain as a MnS phase, whereby dispersing positions of the MnS phase are limited to the pore interior and powder grain boundary. Therefore, an improving effect of the seizure resistance is insufficient. In addition, the MnS powder is stable and does not react with an iron-based matrix, whereby it has low fixability with respect to the matrix and may be exfoliated during sliding.

SUMMARY OF THE INVENTION

The present invention has been made in view of the above circumstances, and it is an object thereof to provide an iron-based sintered alloy for sliding member in which seizure resistance is improved by dispersing sulfide having high fixability with respect to a matrix, and a production method therefor.

The present invention provides an iron-based sintered alloy for sliding member consisting of, by mass %, 10 to 30% of Cu, 0.2 to 2.0% of C, 0.03 to 0.9% of Mn, 0.36 to 3.65% of S, and the balance of Fe and inevitable impurities in the overall composition. The iron-based sintered alloy for sliding member exhibits a metallic structure in which copper phases and pores are dispersed in a matrix that contains mainly a martensite structure, and sulfide particles are precipitated and dispersed in the matrix and the copper phases. The sulfide particles are dispersed at 1 to 30 vol. % with respect to the matrix.

The present invention also provides a production method for an iron-based sintered alloy for sliding member, and the method includes preparing an iron powder, a copper powder, a graphite powder, and at least one sulfide powder of an iron sulfide powder and a copper sulfide powder. The iron powder consists of 0.03 to 1.0 mass % of Mn and the balance of Fe and inevitable impurities. The method also includes forming a raw powder by mixing the copper powder, the graphite powder, and the sulfide powder with the iron powder so as to consist of, by mass %, 10 to 30% of Cu, 0.2 to 2.0% of C, 0.03 to 0.9% of Mn, 0.36 to 3.65% of S, and the balance of Fe and inevitable impurities. The method further includes compacting the raw powder into a green compact with a predetermined shape, sintering the green compact at a temperature of 1000 to 1200° C., and quench hardening and tempering the sintered compact.

According to the present invention, an iron-based sintered alloy for sliding member in which seizure resistance can be improved can be obtained, since the sulfide having high fixability is dispersed in the matrix.

PREFERRED EMBODIMENTS OF THE INVENTION

Figure 1:
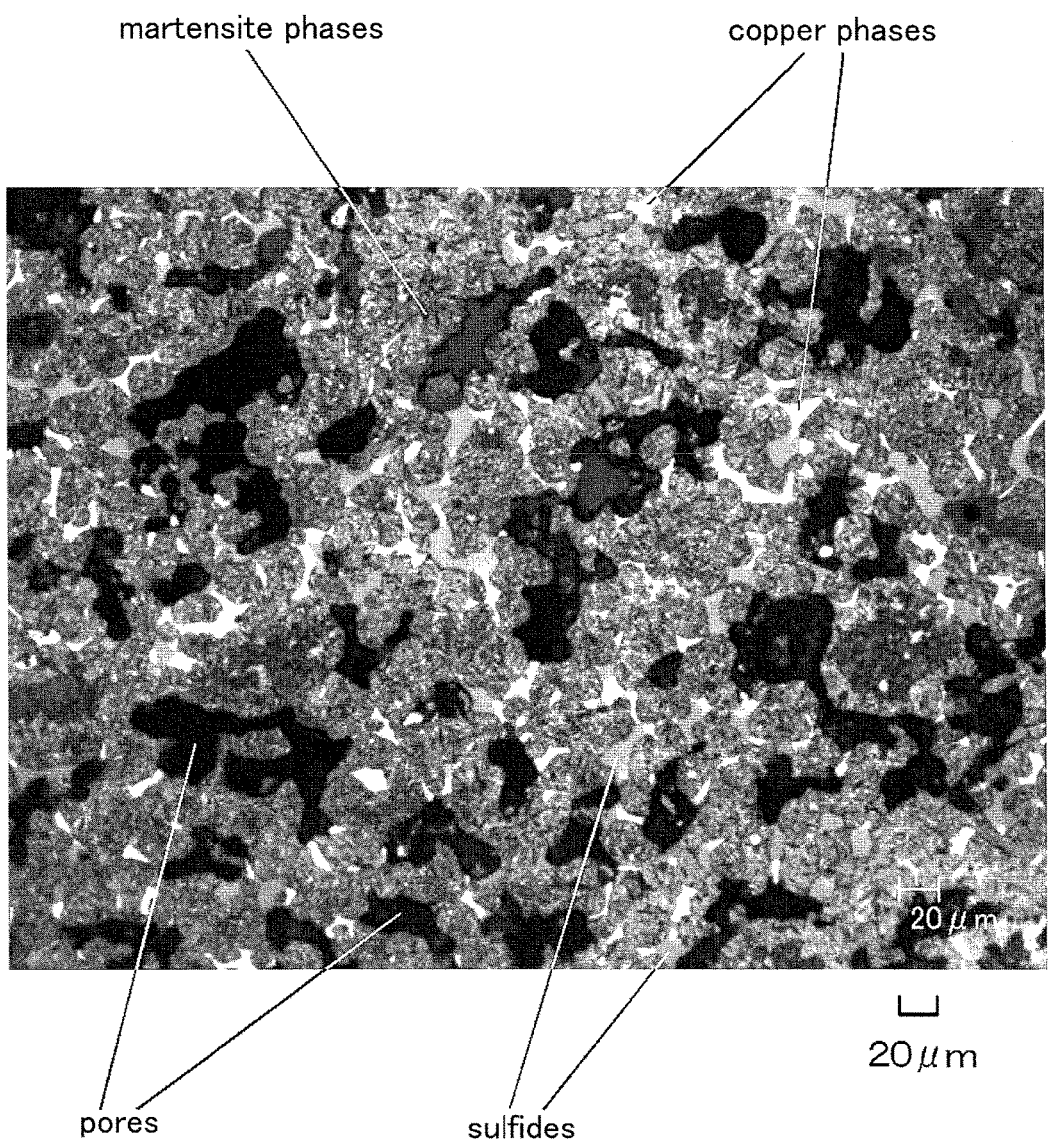
FIG. 1 is a photograph of a metallic structure of an iron-based sintered alloy for sliding member of the present invention, having a magnification of 200.

The grounds of limiting the numerical values in the iron-based sintered alloy for sliding member of the present invention will be described in conjunction with the effects of the present invention hereinafter. In the following description, "%" means "mass %". The iron-based sintered alloy for sliding member of the present invention contains Fe having a higher strength than that of Cu as a primary component. A matrix structure consists of an iron-based matrix (iron alloy matrix). A metallic structure consists of a structure in which copper phases, sulfide particles and pores are dispersed.

The iron-based matrix is formed of the iron powder. The pores are generated by the powder metallurgical method and are formed such that spaces are formed among the raw powder particles when the raw powder is compacted, and the spaces remain as pores in the iron-based matrix that is formed by bonding the raw powder particles.

The Cu powder is added to the raw powder. Cu dispersed and dissolved in the iron-based matrix, which is in an austenite state under high temperature in the sintering, becomes a supersaturated state at room temperature, and it is isolated and precipitated, and therefore, the Cu phase is formed. In the iron-based sintered alloy for slide member of the present invention, conformability and seizure resistance with respect to a mating member (an iron-based member) for sliding are improved by dispersing the copper phases in the iron-based matrix.

In the iron-based sintered alloy for sliding member of the present invention, the seizure resistance with respect to a mating member (an iron-based member) for sliding is further improved by dispersing the sulfide particles in the matrix in addition to the above copper phases. In general, an iron powder contains approximately 0.03 to 1.0 mass % of Mn according to production method. Naturally, the iron-based matrix contains a small amount of Mn. Therefore, by adding S, sulfide particles such as manganese sulfides and the like are precipitated in the matrix as a solid lubricant. The manganese sulfides finely precipitate and improve machinability, but they are too small to greatly improve seizure resistance. In view of this, in the present invention, not only the amount of S for the reaction with the small amount of Mn contained in the matrix, but also an additional amount of S, is added so as to form iron sulfides (FeS) and copper sulfides (CuS) by combining the further added S with Fe of the primary component and Cu of the secondary component. Therefore, the sulfide particles precipitated in the matrix are primarily composed of the iron sulfides, which are made of Fe of the primary component, and a part of the amount of the sulfides is copper sulfides or complex sulfides of iron and copper, and is the manganese sulfides, which are made of Mn of the inevitable impurities.

The iron sulfides, the copper sulfides and the iron and copper complex sulfides are sulfide particles with sizes that are suitable for improving the sliding characteristics as a solid lubricant. The iron sulfides are formed by combining S with Fe of the primary component in the matrix and are thereby uniformly dispersed in the matrix.

As described above, in the present invention, S is added at an amount for combining with Mn contained in the matrix, and S is further added so as to precipitate the sulfides by combining with Fe of the primary component in the matrix. When the amount of the sulfide particles dispersed in the matrix is less than 1 vol. %, the lubricating effect is not sufficiently obtained, and the sliding characteristics are decreased. On the other hand, the lubricating effect of the iron-based sintered alloy for sliding member is increased as the amount of the sulfide particles is increased. However, the amount of the sulfides is excessive with respect to the matrix, whereby the strength of the iron-based sintered alloy for sliding member is decreased. Accordingly, it is necessary that the amount of the sulfide particles be set to be 30 vol. % or less with respect to the matrix, in order to obtain strength enough to withstand high pressure of 20 MPa. That is, the amount of the sulfide particles in the matrix is set to be 1 to 30 vol. % with respect to the matrix.

In order to obtain this amount of the sulfides primarily composed of the iron sulfides, the amount of S in the overall composition is set to be 0.36 to 3.65 mass %. When the amount of S is less than 0.36 mass %, the predetermined amount of the sulfide particles is not obtained. In contrast, when the amount of S is greater than 3.65 mass %, the sulfide particles are excessively precipitated.

The S is given by adding iron sulfide powder, which is easily decomposed, that is, by adding at least one of the iron sulfide powder and copper sulfide powder to the raw powder primarily composed of the iron powder. The iron sulfide powder and the copper sulfide powder are decomposed to Fe and S and Cu and S in the sintering. The S generated by this decomposition is combined with Fe on the circumference of the original iron sulfide powder and the original copper sulfide powder, so as to form FeS and generate eutectic liquid phases with Fe, and as a result, liquid phase sintering is carried out and neck growth between powder particles is accelerated. In addition, S uniformly disperses from the eutectic liquid phases to the iron-based matrix, a part of the S is precipitated as manganese sulfide by bonding with Mn in the iron-based matrix, and remainder of the S is precipitated as iron sulfide in the iron-based matrix. When the copper sulfide powder is used, Cu created by decomposing in the sintering contributes to strengthening of the iron-based matrix due to dispersion to the iron-based matrix.

Thus, since the sulfides such as the manganese sulfides, the iron sulfides, or the like, are precipitated in the iron-based matrix by combining S with Mn and Fe in the matrix, they are more uniformly dispersed in comparison with the conventional techniques in which sulfides are added and dispersed. In addition, the sulfides are firmly fixed to the matrix by precipitating and dispersing and are not easily exfoliated during sliding. Accordingly, superior sliding characteristics are obtained for a long period of time, and the seizure resistance of the iron-based sintered alloy for sliding member is improved.

As described above, since the liquid-phase sintering occurs and the diffusion among the raw powder particles is smoothly performed, the strength of the iron-based matrix is improved, and the wear resistance of the iron-based matrix is increased. In the iron-based sintered alloy for sliding member in a sliding bearing assembly of the present invention, the solid lubricant is dispersed in the pores and grain boundaries of the powder particles and is also uniformly dispersed in the matrix by firmly fixing to the matrix. Accordingly, the sliding characteristics and the strength of the matrix are improved, and the wear resistance is increased.

In the iron-based sintered alloy for sliding member of the present invention, in order to use even in a condition of a high surface pressure of 20 MPa, the iron-based matrix has a metallic structure primarily composed of martensite. Here, the metallic structure primarily composed of martensite means a metallic structure containing a martensite structure at not less than 50% by area ratio in cross section except for pores, and preferable not less than 80% by area ratio in cross section of an iron-based matrix portion (a portion in which areas of the sulfides and the copper phases are removed from the metallic structure except for the pores). That is, the martensite structure is hard and has high strength. Therefore, by forming not less than 50% of the metallic structure except for pores so as to be such a martensite structure, plastic deformation of the matrix is prevented and superior sliding characteristics are obtained even in a sliding condition in which high surface pressure is applied. It is more preferable that the entirety of the matrix structure be made of martensite. Otherwise, a part of the iron-based matrix may be a metallic structure of sorbite, troostite, bainite, or the like.

Figure 2:
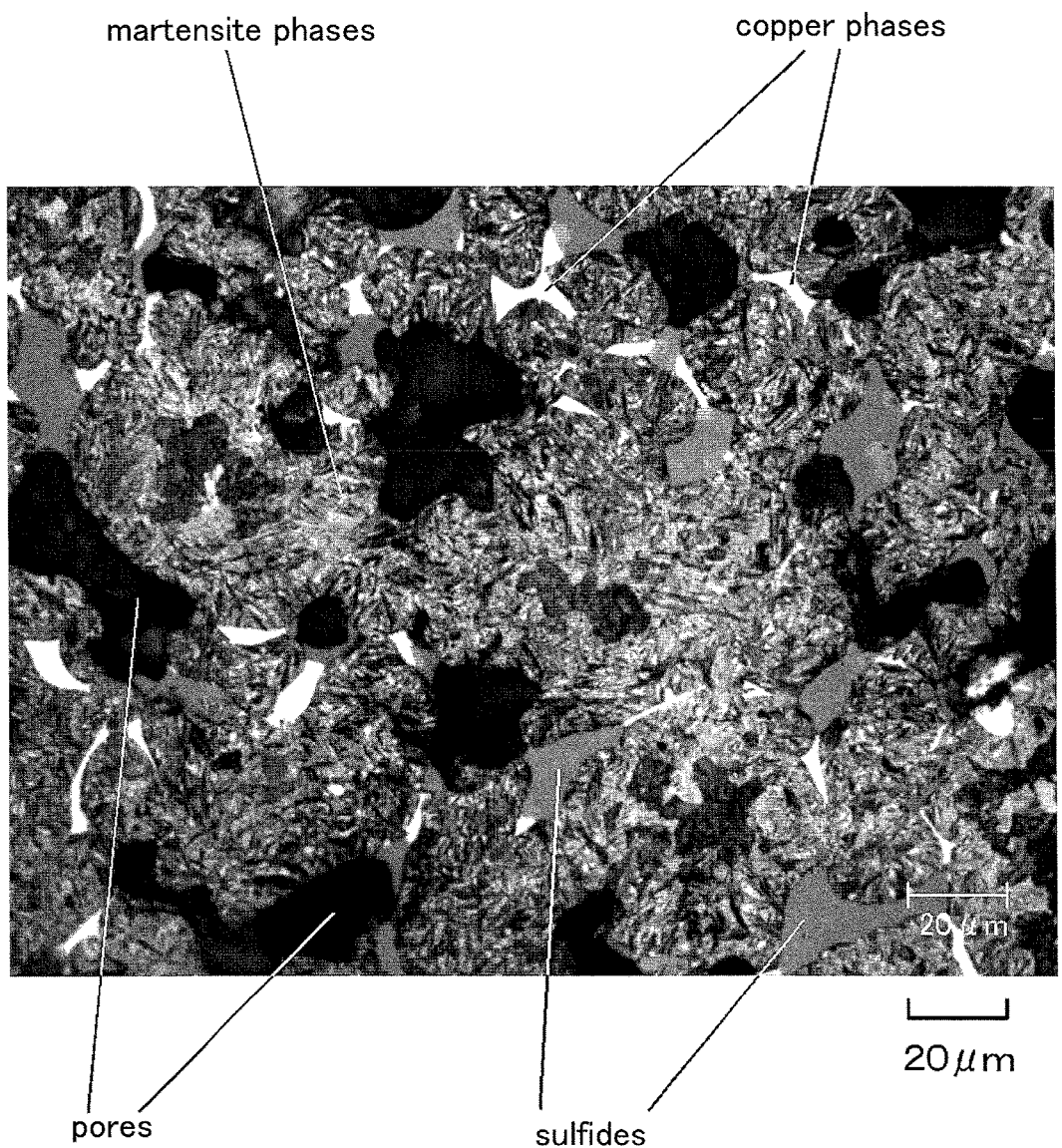
FIG. 2 is a photograph of the metallic structure of the same iron-based sintered alloy for sliding member in FIG. 1, having a magnification of 500.

FIG. 1 is a photograph of a metallic structure of an iron-based sintered alloy for sliding member of the present invention. FIGS. 1 and 2 are photographs of metallic structures in which a cross section of an iron-based sintered alloy consisting of 1.09 mass % of S, 10 mass % of Cu, 1.0 mass % of C and the balance of Fe is mirror-polished and etched by 3% nital (nitric acid-alcohol solution). FIG. 1 is a photograph at a magnification of 200, and FIG. 2 is a photograph at a magnification of 500. As is apparent from these photographs of the metallic structures, most of the matrix structure is martensite phases, and copper phases are dispersed in the martensite phases. Most of sulfides are dispersed in the matrix, and a part thereof is dispersed in the copper phases.

It is difficult to form sulfides of Cu at room temperature in comparison with Fe. However, it is easy to form sulfides at high temperatures since standard formation free energy is less than that of Fe. In addition, Cu has low solid solubility limit to α-Fe and does not form chemical compounds, whereby, Cu dissolved in γ-Fe at a high temperature is precipitated as a simple Cu in α-Fe in a cooling process. Therefore, Cu once dissolved in the iron-based matrix in the cooling process during sintering, is precipitated as a free copper phase from the iron-based matrix, and is dispersed in the iron-based matrix. In a Cu precipitating process in this cooling, Cu forms a core and bonds with surrounding S, whereby metallic sulfides (copper sulfide, iron sulfide, and complex sulfide of iron and copper) are formed, and precipitation of sulfide particles (iron sulfide) is promoted around the metallic sulfides. In addition, the copper phase in which the sulfides are dispersed is soft, whereby the degree of wear characteristics with respect to the mating material is decreased and the seizure resistance with respect to mating member is improved. Furthermore, Cu dissolved in the iron-based matrix without depositing as a copper phase contributes to strengthening the iron-based matrix, and it contributes to strengthening the iron-based matrix by improving hardenability of the iron-based matrix so as to micronize a pearlite structure. The amount of Cu that is required is not less than 10 mass % in order to obtain these effects. On the other hand, when the amount of Cu is excessive, a great amount of the copper phase with low strength is dispersed, whereby the strength of the iron-based sintered alloy for sliding member is decreased. Moreover, in this case, the liquid phase is excessively generated in the sintering, whereby the iron-based sintered alloy for sliding member is easily changed in shape. Accordingly, the upper limit of the amount of Cu is set to be 30 mass %.

When Cu is added in the form of an iron alloy powder by solid solving Cu in Fe, the raw powder is hardened, and the compressibility of the raw powder is decreased. Therefore, Cu is added in the form of a copper powder. The copper powder generates a Cu liquid phase in the sintering and wets and covers the iron powder particles, thereby being dispersed in the iron powder particles. In addition, Cu rapidly diffuses into the iron-based matrix. Accordingly, even when Cu is added in the form of the copper powder, Cu is approximately uniformly diffused in the iron-based matrix.

When copper phases are dispersed in the matrix structure, there are cases in which a part of the amount of the copper phases forms copper sulfides. When such copper sulfides are dispersed in the matrix, the amount of the iron sulfides is decreased with an increase in the amount of the copper sulfides. However, the copper sulfides also act as a solid lubricant. Therefore, it does not affect the sliding characteristics.

C is used for strengthening the iron-based matrix by solid solving C therein and is also used for forming a martensite structure in the matrix structure. When the amount of C is insufficient, ferrite with low strength is dispersed in the matrix structure, whereby strength and wear resistance are decreased. Therefore, the amount of C is set to be not less than 0.2 mass %. On the other hand, when the amount of C is excessive, brittle cementite with a netlike appearance is precipitated, and as a result, the iron-based sintered alloy cannot withstand a high pressure of 20 MPa. Therefore, the upper limit of the amount of C is set to be 2.0 mass %. If C is added in the form of an iron alloy powder by solid solving C in Fe, the raw power is hardened, and the compressibility is decreased. Accordingly, C is added in the form of a graphite powder.

The raw powder for the iron-based sintered alloy for sliding member of the present invention is obtained by mixing the above powders, that is, (1) an iron powder consisting of 0.03 to 1.0 mass % of Mn and the balance of Fe and inevitable impurities, (2) a copper powder, (3) a graphite powder, and (4) an iron sulfide powder, so as to consist of, by mass %, 10 to 30% of Cu, 0.2 to 2.0% of C, 0.03 to 0.9% of Mn, 0.36 to 3.65% of S, and the balance of Fe and inevitable impurities. This raw powder is compacted, sintered and heat-treated, and therefore, the iron-based sintered alloy for sliding member of the present invention can be produced.

Compacting of the raw powder is carried out by a conventional die pressing method. That is, the raw powder is compacted into a green compact. In this method, a die assembly including a die, a lower punch, a core rod, and an upper punch is used. The die has a hole for forming an outer circumferential shape of a product. The lower punch is slidably fitted into the hole of the die and forms a lower end surface of the product. The core rod forms an inner circumferential shape or a recess portion of the product as necessary. The die, the lower punch, and the core rod form a cavity. The upper punch forms an upper end surface of the product. The raw powder is filled into the cavity and is compacted into a green compact by the upper punch and the lower punch. Then, the green compact is pulled out from the hole of the die.

The green compact is sintered in a sintering furnace at a temperature in a range of 1000 to 1200° C. The heating temperature, that is, the sintering temperature, greatly affects the reaction rate of sintering and diffusion of elements. If the sintering temperature is less than 1000° C., the Cu liquid phase is insufficiently generated, whereby a predetermined metallic structure is difficult to obtain. In contrast, if the sintering temperature is greater than 1200° C., the liquid phase is excessively generated, whereby the sintered compact easily loses its shape. Therefore, the sintering temperature is set to be at a temperature in the range of 1000 to 1200° C.

The sintered compact is quench hardened so that not less than 50% of the matrix structure is made of a martensite structure. The quench hardening treatment is performed by heating the sintered compact to be not less than the austenite transformation temperature and then by rapidly cooling in oil or water, as is conventionally done. It is appropriate that the heating temperature be 820 to 1000° C. in the quench hardening treatment. The quench hardening treatment is performed in a nonoxidizing atmosphere or may be performed in a carburizing atmosphere.

The sintered compact after the quench hardening treatment has a hard and brittle metallic structure because strain is excessively accumulated by the quench hardening treatment. Therefore, a tempering treatment is performed on the sintered compact after the quench hardening treatment, as is conventionally done. The tempering treatment is performed by reheating the sintered compact to a temperature in a range of 150 to 280° C. and then by cooling the sintered compact to room temperature. By performing such tempering treatment, internal stress is decreased, and strain generated by the quench hardening treatment is removed without decreasing the hardness of the sintered compact. If the heating temperature in the tempering is less than 150° C., strain is not sufficiently removed. On the other hand, if the heating temperature is greater than 280° C., the low carbon martensite tends to be decomposed into ferrite and cementite, and the hardness is decreased.

In this iron-based sintered alloy for sliding member of the present invention obtained by the above method, not less than 50% of the matrix is made of martensite, and sulfide particles are precipitated and dispersed. A large amount of iron sulfides, and small amounts of manganese sulfides and copper sulfides, are dispersed in the matrix. The sulfide particles have superior sliding characteristics, and sliding characteristics of the iron-based sintered alloy for sliding member are improved. In addition, soft copper phases are dispersed in the matrix, whereby the degree of wear characteristics with respect to a mating member is further decreased. Since liquid-phase sintering occurs and diffusion among the raw powder particles is smoothly performed, the strength of the iron-based matrix is improved, and the wear resistance of the iron-based matrix is improved. The solid lubricant is uniformly dispersed in the matrix in addition to the pores and the powder grain boundaries and is firmly fixed to the matrix. Accordingly, the sliding characteristics and the strength of the matrix are improved, and the wear resistance is improved.

EXAMPLES

First Example

An iron sulfide powder containing 36.48 mass % of S, a copper powder and a graphite powder were added to an iron powder containing 0.3 mass % of Mn at mixing ratios shown in Table 1, so as to vary the mixing ratio of the iron sulfide powder, and were mixed, whereby a raw powder was obtained. The raw powder was compacted at a compacting pressure of 600 MPa, and a larger green compact and a smaller green compact were formed. The larger green compact had a ring shape with an outer diameter of 75 mm, an inner diameter of 45 mm, and a height of 51 mm. The smaller green compact had a square pillar shape with a width of 10 mm, a depth of 10 mm, and a height of 100 mm. Next, these green compacts were sintered at 1150° C. in a nonoxidizing gas atmosphere, and they were maintained at 850° C. in a nonoxidizing gas atmosphere and were oil quenched. Then, these sintered compacts were tempered at 180° C., whereby samples of sintered alloys of Samples Nos. 01 to 13 were formed. The overall compositions of these samples are also shown in Table 1.

Volume % of each phase in the sintered alloy is equal to area % in each phase when a cross sectional metallic structure of the sintered alloy is observed. Thus, in each of these samples, a cross sectional structure was observed, and a ratio of an area of sulfides, an area of copper phases, and an area of martensite phases in the iron-based matrix except for pores was measured by using image analyzing software ("WinROOF" produced by Mitani Corporation). That is, when an iron-based matrix portion except for pores is set to be 100, a ratio of an area of sulfides, copper phases and martensite phases was measured instead of volume % of each phase. These results are shown in Table 2.

In addition, the iron-based sintered alloy in a ring shape was processed into a ring shape with an outer diameter of 70 mm, an inner diameter of 50 mm, and a height of 50 mm using a lathe, after it was vacuum-impregnated with lubricating oil corresponding to ISOVG 460 (kinetic viscosity at 40° C. of 460 cSt). Then, seizing time was measured by a bearing tester, using a heat treated steel of SCM435H specified by the Japanese Industrial Standards (JIS) as a mating material. Specifically, in a bearing test, the sintered alloy in a ring shape was fixed to a housing, and a shaft as a mating member was inserted into an inner surface thereof. The shaft was loaded in a radial direction, and it was rotated at a surface pressure of 60 MPa and a sliding speed of 2.0 m per minute while swaying within an angle range of 60 degrees. In this case, swaying motion was paused for 0.5 seconds at both terminal positions. When friction coefficient of the sintered alloy exceeded 0.3, the sintered alloy was judged to be in a seized up state, and sliding time until it reached the seized up state was measured as seizing time. This result is also shown in Table 2.

Furthermore, the sintered alloy in a square pillar shape was processed into a No. 10 test piece specified by Japanese Industrial Standards Z2201 to form a tensile strength test piece. The test piece was tested by a method specified by Japanese Industrial Standards Z2241, using an "AUTO-GRAPH" manufactured by Shimadzu Corporation, and a tensile strength was measured. This result is also shown in Table 2.

Here, in the following evaluations, when the seizing time exceeded 45 hours and the tensile strength exceeded 250 MPa, it was judged that the sintered alloy was superior.

TABLE 1

| | Mixing ratio mass % | | | | Overall composition mass % | | | | |
|---|---|---|---|---|---|---|---|---|---|
| No. | Iron powder | Copper powder | Iron sulfide powder | Graphite powder | Fe | Cu | Mn | S | C |
| 01 | Bal. | 20.00 | 0.00 | 1.00 | Bal. | 1.50 | 0.24 | 0.00 | 1.00 |
| 02 | Bal. | 20.00 | 0.50 | 1.00 | Bal. | 1.50 | 0.24 | 0.18 | 1.00 |
| 03 | Bal. | 20.00 | 0.99 | 1.00 | Bal. | 1.50 | 0.23 | 0.36 | 1.00 |
| 04 | Bal. | 20.00 | 2.00 | 1.00 | Bal. | 1.50 | 0.23 | 0.73 | 1.00 |
| 05 | Bal. | 20.00 | 3.00 | 1.00 | Bal. | 1.50 | 0.23 | 1.09 | 1.00 |
| 06 | Bal. | 20.00 | 4.00 | 1.00 | Bal. | 1.50 | 0.23 | 1.46 | 1.00 |
| 07 | Bal. | 20.00 | 5.00 | 1.00 | Bal. | 1.50 | 0.22 | 1.82 | 1.00 |
| 08 | Bal. | 20.00 | 6.00 | 1.00 | Bal. | 1.50 | 0.22 | 2.19 | 1.00 |
| 09 | Bal. | 20.00 | 7.00 | 1.00 | Bal. | 1.50 | 0.22 | 2.55 | 1.00 |
| 10 | Bal. | 20.00 | 8.00 | 1.00 | Bal. | 1.50 | 0.21 | 2.92 | 1.00 |
| 11 | Bal. | 20.00 | 9.00 | 1.00 | Bal. | 1.50 | 0.21 | 3.28 | 1.00 |
| 12 | Bal. | 20.00 | 10.01 | 1.00 | Bal. | 1.50 | 0.21 | 3.65 | 1.00 |
| 13 | Bal. | 20.00 | 11.00 | 1.00 | Bal. | 1.50 | 0.20 | 4.01 | 1.00 |

TABLE 2

| No. | Amount of sulfides area % | Amount of copper phase area % | Amount of martensite phase area % | Seizing time h | Tensile strength MPa | Notes |
|---|---|---|---|---|---|---|
| 01 | 0.0 | 16.1 | 83.9 | 38 | 400 | conventional material |
| 02 | 0.4 | 14.2 | 85.4 | 40 | 380 | out of sulfide lower limit |
| 03 | 2.8 | 13.5 | 83.7 | 45 | 350 | sulfide lower limit |
| 04 | 5.3 | 12.2 | 82.5 | 48 | 330 | |
| 05 | 7.7 | 11.1 | 81.2 | 51 | 320 | |
| 06 | 10.1 | 10.2 | 79.7 | 53 | 300 | |
| 07 | 12.4 | 9.0 | 78.6 | 54 | 285 | |
| 08 | 14.5 | 8.1 | 77.4 | 54 | 275 | |
| 09 | 16.7 | 7.5 | 75.8 | 53 | 270 | |
| 10 | 20.0 | 7.0 | 73.0 | 51 | 265 | |
| 11 | 24.0 | 6.6 | 69.4 | 49 | 255 | |
| 12 | 29.0 | 6.2 | 64.8 | 47 | 250 | sulfide upper limit |
| 13 | 34.0 | 6.0 | 60.0 | 38 | 200 | out of sulfide upper limit |

As is apparent from Tables 1 and 2, in the sample of Sample No. 10, sulfides were not precipitated since S was not contained. However, when S was given by adding the iron sulfide powder to the raw powder, the sulfides were dispersed in the iron-based matrix and an amount of the sulfides dispersed in the iron-based matrix was increased as an amount of S was increased. In addition, copper sulfide was formed by binding a part of S with Cu, whereby Cu for binding with S was increased as an amount of S was increased and an amount of the copper phase was decreased for that. An area ratio of the martensite phase in the iron-based matrix was decreased, since an increasing amount of the sulfide particles was greater than a decreasing amount of the copper phase.

In the samples in which S was not contained or an amount of S was less than 0.36 mass %, an amount of the sulfides was small and the seizing time was short, due to an effect of such metallic structure. In contrast, in the sample of Sample No. 03 in which an amount of S was 0.36 mass %, the seizing time exceeded 45 hours since the sulfides were sufficiently obtained. The seizing time is increased until the amount of S was 2.19 mass %, since the sulfides were increased as S was increased. In addition, when the amount of the sulfides dispersed in the iron-based matrix was increased, strength of the iron-based matrix decreased, whereby the tensile strength was decreased as the amount of S was increased. In the sample of Sample No. 13 in which an amount of S exceeded 3.65 mass %, the tensile strength was less than 250 MPa. When an amount of S exceeded 2.19 mass %, the seizing time was conversely shortened as the amount of S was increased, due to an effect of strength degradation of this iron-based matrix. In the sample of Sample No. 13 in which the amount of S exceeded 3.65 mass %, the seizing time was less than 45 hours. As described above, by adding the iron sulfide powder to the raw powder, it was confirmed that the sulfides could be formed in the iron-based matrix and that the amount of S should be set to be in a range of 0.36 to 3.65 mass % in this time.

Second Example

A copper sulfide powder containing 33.54 mass % of S, a copper powder and a graphite powder were added to an iron powder containing 0.3 mass % of Mn at mixing ratios shown in Table 3, so as to vary the mixing ratio of the copper sulfide powder, and were mixed, whereby a raw powder was obtained. Samples of sintered alloys of Samples Nos. 14 to 25 were produced in the same manner as that of the First Example. The overall compositions of these samples are also shown in Table 3.

In these samples, a ratio of an area of sulfides, an area of copper phases, and an area of martensite phases in the iron-based matrix except for pores was measured in the same manner as that of the First Example. In addition, the seizing time was measured by carrying out the seizing test and the tensile strength was measured by carrying out the tensile test in the same manner as that of the First Example. The results are shown in Table 4. Here, the results of the sample of Sample No. 01 (an example not containing S) in the First Example are shown in Tables 3 and 4.

TABLE 3

| | Mixing ratio mass % | | | | Overall composition mass % | | | | |
|---|---|---|---|---|---|---|---|---|---|
| No. | Iron powder | Copper powder | Iron sulfide powder | Graphite powder | Fe | Cu | Mn | S | C |
| 01 | Bal. | 20.00 | 0.00 | 1.00 | Bal. | 20.00 | 0.24 | 0.00 | 1.00 |
| 14 | Bal. | 20.00 | 0.50 | 1.00 | Bal. | 20.33 | 0.24 | 0.17 | 1.00 |
| 15 | Bal. | 20.00 | 1.07 | 1.00 | Bal. | 20.71 | 0.23 | 0.36 | 1.00 |
| 16 | Bal. | 20.00 | 2.00 | 1.00 | Bal. | 21.33 | 0.23 | 0.67 | 1.00 |
| 17 | Bal. | 20.00 | 3.00 | 1.00 | Bal. | 21.99 | 0.23 | 1.01 | 1.00 |
| 18 | Bal. | 20.00 | 4.00 | 1.00 | Bal. | 22.66 | 0.23 | 1.34 | 1.00 |
| 19 | Bal. | 20.00 | 5.00 | 1.00 | Bal. | 23.32 | 0.22 | 1.68 | 1.00 |
| 20 | Bal. | 20.00 | 6.00 | 1.00 | Bal. | 23.99 | 0.22 | 2.01 | 1.00 |
| 21 | Bal. | 20.00 | 7.00 | 1.00 | Bal. | 24.65 | 0.22 | 2.35 | 1.00 |
| 22 | Bal. | 20.00 | 8.00 | 1.00 | Bal. | 25.32 | 0.21 | 2.68 | 1.00 |
| 23 | Bal. | 20.00 | 9.00 | 1.00 | Bal. | 25.98 | 0.21 | 3.02 | 1.00 |

TABLE 3-continued

| | Mixing ratio mass % | | | | Overall composition mass % | | | |
|---|---|---|---|---|---|---|---|---|
| No. | Iron powder | Copper powder | Iron sulfide powder | Graphite powder | Fe | Cu | Mn | S | C |
| 24 | Bal. | 20.00 | 10.74 | 1.00 | Bal. | 27.14 | 0.20 | 3.60 | 1.00 |
| 25 | Bal. | 20.00 | 11.74 | 1.00 | Bal. | 27.80 | 0.20 | 3.94 | 1.00 |

TABLE 4

| No. | Amount of sulfides area % | Amount of copper phase area % | Amount of martensite phase area % | Seizing time h | Tensile strength MPa | Notes |
|---|---|---|---|---|---|---|
| 01 | 0.0 | 16.1 | 83.9 | 38 | 400 | conventional material |
| 14 | 0.3 | 15.5 | 84.2 | 42 | 380 | out of sulfide lower limit |
| 15 | 2.8 | 14.9 | 82.3 | 45 | 360 | sulfide lower limit |
| 16 | 4.8 | 14.0 | 81.2 | 48 | 330 | |
| 17 | 7.2 | 12.9 | 79.9 | 51 | 320 | |
| 18 | 9.2 | 12.0 | 78.8 | 54 | 310 | |
| 19 | 11.0 | 11.1 | 77.9 | 56 | 290 | |
| 20 | 13.5 | 10.2 | 76.3 | 56 | 280 | |
| 21 | 15.5 | 9.5 | 75.0 | 55 | 275 | |
| 22 | 18.0 | 8.9 | 73.1 | 54 | 265 | |
| 23 | 21.0 | 8.5 | 70.5 | 52 | 260 | |
| 24 | 29.0 | 8.0 | 63.0 | 48 | 250 | sulfide upper limit |
| 25 | 33.0 | 7.8 | 59.2 | 39 | 205 | out of sulfide upper limit |

As is apparent from Tables 3 and 4, in the sample of Sample No. 10, sulfides were not precipitated since S was not contained. However, S generated by decomposing the copper sulfide was bound with Fe in the iron-based matrix by adding the copper sulfide powder to the raw powder, whereby the sulfides were dispersed in the iron-based matrix. In addition, when the amount of S in the overall compositions was increased by increasing the additional amount of the copper sulfide powder, the amount of the sulfides dispersed in the iron-based matrix as the amount of S increased. Furthermore, in the same manner as that in the First Example, copper phases were decreased as an amount of S was increased by increasing an additional amount of the copper sulfide powder. However, since Cu generated by decomposing the copper sulfide increased, a decreasing ratio of the copper phases due to sulfide precipitation was smaller than that of the First Example in which an amount of Cu was fixed. Therefore, a decreasing ratio of the martensite was also smaller than that of the First Example.

The seizing time and the tensile strength had the same tendency as that of the First Example in which S was given by the iron sulfide powder, due to the above effect of the metallic structure of the iron sulfide powder. That is, in the samples in which S was not contained or an amount of S was less than 0.36 mass %, the amount of the sulfides was small and the seizing time was short. In contrast, in the sample of Sample No. 03 in which an amount of S was 0.36 mass %, the sintering time exceeded 45 hours since the sulfides were sufficiently obtained. The seizing time is increased until the amount of S was 1.68 mass %, since the sulfides were increased as S was increased. Here, in the Second Example, the amount of the copper phases was increased due to Cu generated by decomposing the copper sulfide, and as a result, the seizing time was longer than that in the First Example. However, when the amount of the sulfides dispersed in the iron-based matrix was increased, strength of the iron-based matrix decreased in the same manner as that in the First Example. Therefore, when an amount of S exceeded 2.01 mass %, the seizing time was conversely shortened as the amount of S was increased, due to the above effect. In the sample of Sample No. 13 in which the amount of S exceeded 3.65 mass %, the seizing time was less than 45 hours.

In addition, the tensile strength was also decreased as the amount of S was increased, in the same manner as that in the First Example. In the sample of Sample No. 13 in which an amount of S exceeded 3.65 mass %, the tensile strength was less than 250 MPa. As described above, even if the copper sulfide powder was added to the raw powder, instead of the iron sulfide powder, it was confirmed that the sulfides could be formed in the iron-based matrix and that the amount of S should be set to be in a range of 0.36 to 3.65 mass % in this time.

Third Example

An iron sulfide powder containing 36.48 mass % of S, a copper powder and a graphite powder were added to an iron powder containing 0.3 mass % of Mn at mixing ratios shown in Table 5, so as to vary the mixing ratio of the copper sulfide powder, and were mixed, whereby raw powders were obtained. Samples of sintered alloys of Samples Nos. 26 to 31 were produced in the same manner as that of the First Example. The overall compositions of these samples are also shown in Table 5.

In these samples, a ratio of an area of sulfides, an area of copper phases, and an area of martensite phases in the iron-based matrix except for pores was measured in the same manner as that of the First Example. In addition, the seizing time was measured by carrying out the seizing test and the tensile strength was measured by carrying out the tensile test in the same manner as that of the First Example. These results are shown in Table 6. Here, the results of the sample of Sample No. 07 in the First Example are shown in Tables 5 and 6.

TABLE 5

| | Mixing ratio mass % | | | | Overall composition mass % | | | |
|---|---|---|---|---|---|---|---|---|
| No. | Iron powder | Copper powder | Iron sulfide powder | Graphite powder | Fe | Cu | Mn | S | C |
| 26 | Bal. | 5.00 | 5.00 | 1.00 | Bal. | 5.00 | 0.27 | 1.82 | 1.00 |
| 27 | Bal. | 10.00 | 5.00 | 1.00 | Bal. | 10.00 | 0.25 | 1.82 | 1.00 |
| 28 | Bal. | 15.00 | 5.00 | 1.00 | Bal. | 15.00 | 0.24 | 1.82 | 1.00 |
| 07 | Bal. | 20.00 | 5.00 | 1.00 | Bal. | 20.00 | 0.22 | 1.82 | 1.00 |
| 29 | Bal. | 25.00 | 5.00 | 1.00 | Bal. | 25.00 | 0.21 | 1.82 | 1.00 |
| 30 | Bal. | 30.00 | 5.00 | 1.00 | Bal. | 30.00 | 0.19 | 1.82 | 1.00 |
| 31 | Bal. | 35.00 | 5.00 | 1.00 | Bal. | 35.00 | 0.18 | 1.82 | 1.00 |

TABLE 6

| No. | Amount of sulfides area % | Amount of copper phase area % | Amount of martensite phase area % | Seizing time h | Tensile strength MPa | Notes |
|---|---|---|---|---|---|---|
| 26 | 8.8 | 0.0 | 91.2 | 38 | 380 | out of Cu lower limit |
| 27 | 12.3 | 2.3 | 85.4 | 45 | 320 | Cu lower limit |
| 28 | 12.3 | 5.0 | 82.7 | 50 | 294 | |
| 07 | 12.4 | 9.0 | 78.6 | 54 | 285 | |
| 29 | 12.5 | 13.0 | 74.5 | 53 | 275 | |
| 30 | 12.5 | 22.0 | 65.5 | 49 | 250 | Cu upper limit |
| 31 | 12.6 | 29.0 | 58.4 | 39 | 200 | out of Cu upper limit |

As is apparent from Tables 5 and 6, in the sample of Sample No. 26 in which an additional amount of the copper powder was 5 mass % and an amount of Cu in the overall compositions was 5 mass %, since the amount of Cu with respect to the amount of S was insufficient, Cu was used for precipitation of the sulfides, whereby the metallic structure in which the copper phases were not dispersed in the iron-based matrix was formed. In contrast, in the sample of Sample No. 27 in which an amount of Cu in the overall compositions was 10 mass %, the amount of Cu with respect to the amount of S was sufficient, and the copper phases were precipitated at not less than 2 area % in the iron-based matrix. In addition, the amount of the copper phases precipitated and dispersed in the iron-based matrix was increased as the amount of Cu was increased. In the sample of Sample No. 26 in which the amount of Cu with respect to the amount of S was insufficient, an effect to generate the sulfide using Cu was not sufficient. In contrast, in the sample of Sample No. 27 in which the amount of Cu was 10 mass %, the sulfides were increased due to the effect for generating the sulfide using Cu. However, further precipitation of the sulfides was not generated since the amount of S is fixed, even if the amount of Cu exceeded 25 mass %.

In the sample of Sample No. 26 in which the amount of Cu was less than 5 mass %, the copper phases which were soft and had an effect to improve conformability were not dispersed, whereby the seizing time was shortened. In contrast, in the sample of Sample No. 27 in which the amount of Cu was 10 mass %, the seizing time was increased up to 45 hours by dispersing the copper phases, and the seizing time was further increased as the amount of Cu was increased, until the amount of Cu was 20 mass %. However, when the soft copper phases are increased in the iron-based matrix, the strength of the iron-based matrix is decreased. Therefore, when the amount of Cu exceeded 20 mass %, the seizing time was shortened by decreasing the strength of the iron-based matrix, and when the amount of Cu exceeded 30 mass %, the seizing time was less than 45 hours. The tensile strength was decreased as the amount of Cu was increased, since the strength of the iron-based matrix is decreased when the soft copper phases were increased in the iron-based matrix. Thus, when the amount of Cu exceeded 30 mass %, the tensile strength was less than 250 MPa. As described above, it was confirmed that the amount of Cu in the overall compositions should be set to be in a range of 10 to 30 mass %.

Fourth Example

An iron sulfide powder containing 36.48 mass % of S, a copper powder and a graphite powder were added to an iron powder containing 0.3 mass % of Mn at mixing ratios shown in Table 7, so as to vary the mixing ratio of the copper sulfide powder, and were mixed, whereby raw powders were obtained. Samples of sintered alloys of Samples Nos. 32 to 43 were produced in the same manner as that of the First Example. The overall compositions of these samples are also shown in Table 7.

In these samples, a ratio of an area of sulfides, an area of copper phases, and an area of martensite phases in the iron-based matrix except for pores was measured in the same manner as that of the First Example. In addition, the seizing time was measured by carrying out the seizing test and the tensile strength was measured by carrying out the tensile test in the same manner as that of the First Example. The results are shown in Table 8. Here, the results of the sample of Sample No. 07 in the First Example are shown in Tables 7 and 8.

TABLE 7

| | Mixing ratio mass % | | | | Overall composition mass % | | | |
|---|---|---|---|---|---|---|---|---|
| No. | Iron powder | Copper powder | Iron sulfide powder | Graphite powder | Fe | Cu | Mn | S | C |
| 32 | Bal. | 20.00 | 5.00 | 0.00 | Bal. | 20.00 | 0.23 | 1.82 | 0.00 |
| 33 | Bal. | 20.00 | 5.00 | 0.10 | Bal. | 20.00 | 0.22 | 1.82 | 0.10 |
| 34 | Bal. | 20.00 | 5.00 | 0.20 | Bal. | 20.00 | 0.22 | 1.82 | 0.20 |
| 35 | Bal. | 20.00 | 5.00 | 0.40 | Bal. | 20.00 | 0.22 | 1.82 | 0.40 |
| 36 | Bal. | 20.00 | 5.00 | 0.60 | Bal. | 20.00 | 0.22 | 1.82 | 0.60 |
| 37 | Bal. | 20.00 | 5.00 | 0.80 | Bal. | 20.00 | 0.22 | 1.82 | 0.80 |
| 07 | Bal. | 20.00 | 5.00 | 1.00 | Bal. | 20.00 | 0.22 | 1.82 | 1.00 |
| 38 | Bal. | 20.00 | 5.00 | 1.20 | Bal. | 20.00 | 0.22 | 1.82 | 1.20 |
| 39 | Bal. | 20.00 | 5.00 | 1.40 | Bal. | 20.00 | 0.22 | 1.82 | 1.40 |
| 40 | Bal. | 20.00 | 5.00 | 1.60 | Bal. | 20.00 | 0.22 | 1.82 | 1.60 |
| 41 | Bal. | 20.00 | 5.00 | 1.80 | Bal. | 20.00 | 0.22 | 1.82 | 1.80 |
| 42 | Bal. | 20.00 | 5.00 | 2.00 | Bal. | 20.00 | 0.22 | 1.82 | 2.00 |
| 43 | Bal. | 20.00 | 5.00 | 2.20 | Bal. | 20.00 | 0.22 | 1.82 | 2.20 |

TABLE 8

| No. | Amount of sulfides area % | Amount of copper phase area % | Amount of martensite phase area % | Seizing time h | Tensile strength MPa | Notes |
|---|---|---|---|---|---|---|
| 32 | 12.4 | 9.0 | 0.0 | 5 | 120 | out of C lower limit |
| 33 | 12.4 | 9.0 | 47.2 | 32 | 190 | out of C lower limit |
| 34 | 12.4 | 9.0 | 55.0 | 45 | 250 | C lower limit |
| 35 | 12.4 | 9.0 | 62.9 | 48 | 265 | |
| 36 | 12.4 | 9.0 | 78.6 | 51 | 275 | |
| 37 | 12.4 | 9.0 | 78.6 | 53 | 280 | |
| 07 | 12.4 | 9.0 | 78.6 | 54 | 285 | |
| 38 | 12.4 | 9.0 | 78.6 | 53 | 280 | |
| 39 | 12.4 | 9.0 | 78.6 | 52 | 275 | |
| 40 | 12.4 | 9.0 | 78.6 | 50 | 270 | |
| 41 | 12.4 | 9.0 | 78.6 | 48 | 265 | |
| 42 | 12.4 | 9.0 | 78.6 | 46 | 250 | C upper limit |
| 43 | 12.4 | 9.0 | 78.6 | 39 | 190 | out of C upper limit |

As is apparent from Tables 7 and 8, in the sample of Sample No. 32 in which C was not contained, the iron-based matrix consisted of ferrite phases that were soft and had low strength, whereby the seizing time was extremely short and the tensile strength was low. In the sample of Sample No. 33 in which the amount of C was 0.1 mass %, the seizing time was increased since martensite phases were formed in the iron-based matrix. However, the amount of the martensite phases was insufficient, whereby the seizing time was less than 45 hours and the tensile strength was less than 250 MPa. Here, a structure of the remainder was troostite. In contrast, in the sample of Sample No. 34 in which the amount of C was 0.2 mass %, the amount of C dissolved in the iron-based matrix was sufficient, and the amount of the martensite was increased so as to be 50 area % of the metallic structure. Therefore, the iron-based matrix was strengthened, whereby the seizing time exceeded 45 hours and the tensile strength exceeded 150 MPa. In addition, in the sample of Sample No. 35 in which the amount of C was 0.4 mass %, 80% of an iron-based matrix portion (a portion which removed areas of the sulfides and the copper phases from the metallic structure except for pores=100%−12.4%−9%=78.6%) consisted of martensite phases, whereby the seizing time was further extended and the tensile strength was also further increased. Furthermore, in samples in which the amount of C exceeded 0.6 mass %, 100% of the iron-based matrix portion consisted of the martensitic phases, whereby the seizing time was further increased and the tensile strength was increased until the amount of C was 1 mass % due to the effect to strengthen the iron-based matrix. However, when the amount of C exceeded 1.0 mass %, the iron-based matrix became hard; however, it became fragile at the same time. As a result, the seizing time was shortened and the tensile strength was decreased. Furthermore, in the sample of Sample No. 43 in which the amount of C exceeded 2 mass %, the seizing time was less than 45 hours and the tensile strength was less than 250 MPa. As described above, it was confirmed that the amount of C in the overall compositions should be set to be in a range of 0.2 to 2.0 mass %.

Fifth Example

Using the raw powder of Sample No. 07 in the First Example, samples of Samples Nos. 44 to 49 were produced in the same manner as those of the First Example except for changing the sintering temperatures to temperatures shown in Table 9. In these samples, a ratio of an area of sulfides, an area of copper phases, and an area of martensite phases in the iron-based matrix except for pores was measured in the same manner as that of the First Example. In addition, the seizing time was measured by the seizing test and the tensile strength was measured by the tensile test, in the same manners as those in the First Example. The results are shown in Table 9. Here, the results of the sample of Sample No. 07 in the First Example are also shown in Table 9.

TABLE 9

| No. | Sintering temperature ° C. | Amount of sulfides area % | Amount of copper phase area % | Amount of martensite phase area % | Seizing time h | Tensile strength MPa | Notes |
|---|---|---|---|---|---|---|---|
| 44 | 950 | 9.0 | 10.5 | 80.5 | 35 | 180 | out of sintering temperature lower limit |
| 45 | 1000 | 11.0 | 9.5 | 79.5 | 45 | 250 | sintering temperature lower limit |
| 46 | 1050 | 12.0 | 9.0 | 79.0 | 50 | 270 | |
| 47 | 1100 | 12.4 | 9.0 | 78.6 | 53 | 280 | |
| 07 | 1150 | 12.4 | 9.0 | 78.6 | 54 | 285 | |
| 48 | 1200 | 12.4 | 9.0 | 78.6 | 54 | 285 | sintering temperature upper limit |
| 49 | 1250 | stopped by deforming in shape | | | | | out of sintering temperature upper limit |

In the sample in which the sintering temperature was less than 1000° C., the sintering insufficiently progressed and the strength of the iron-based matrix was low, whereby the seizing time was short and the tensile strength was decreased. In contrast, in the sample of Sample No. 45 in which the sintering temperature was 1000° C., the sintering was sufficiently progressed and the strength of the iron-based matrix was high, whereby the seizing time exceeded 45 hours and the tensile strength exceeded 250 MPa. The sintering was further progressed and the strength of the iron-based matrix was improved, as the sintering temperature was increased, whereby the seizing time was increased and the tensile strength was improved. However, in the sample of Sample No. 49 in which the sintering temperature exceeded 1200° C., the test was stopped by deforming in shape. As described above, it was confirmed that the sintering temperature should be set to be in a range of 1000 to 1200° C.

Sixth Example

In the raw powder of Sample No. 07 in the First Example, a sample of Sample No. 50 (Mo: 1.19 mass %) and a sample of Sample No. 51 (Ni: 1.58 mass % and Mo: 0.79 mass %) were produced in the same manner as those of the First Example except for using of an iron alloy powder (Mn: 0.3 mass %) consisting of 1.5 mass % of Mo, and the balance of Fe and inevitable impurities, and an iron alloy powder (Mn: 0.3 mass %) consisting of 2 mass % of Ni, 1 mass % of Mo, and the balance of Fe and inevitable impurities, instead of the iron powder. In these samples, a ratio of an area of sulfides, an area of copper phases, and an area of martensite phases in the iron-based matrix except for pores were measured in the same manner as in the First Example. In addition, the seizing time was measured by the seizing test and the tensile strength was measured by the tensile test, in the same manners as those in the First Example. The results are shown in Table 10. Here, the results of the sample of Sample No. 07 in the First Example are also shown in Table 10.

TABLE 10

| No. | Amount of sulfides area % | Amount of copper phase area % | Amount of martensite phase area % | Seizing time h | Tensile strength MPa | Notes |
|---|---|---|---|---|---|---|
| 07 | 12.4 | 9.0 | 88.0 | 54 | 285 | |
| 50 | 12.4 | 9.0 | 90.0 | 57 | 292 | Mo: 1.19% |
| 51 | 12.4 | 9.0 | 92.0 | 60 | 300 | Ni: 1.58%, Mo: 0.79% |

As is apparent from Table 10, in the samples of Samples Nos. 50 and 51 in which Mo or Ni was dissolved in the iron-based matrix by adding Mo or Ni to the iron alloy powder, since the iron-based matrix was strengthened by Ni or Mo, the seizing time was extended and the tensile strength was increased in comparison with the sample of Sample No. 07 in which Ni or Mo was not dissolved in the iron-based matrix. Therefore, it was confirmed that the iron-based matrix was strengthened by dissolving Mo or Ni in the iron-based matrix, whereby the seizing time was extended and the tensile strength was improved.

What is claimed is:
1. An iron-based sintered alloy for a sliding member, the iron-based sintered alloy consisting of, by mass %:
more than 15% and 30% or less of Cu,
0.2 to 2.0% of C,
0.03 to 0.9% of Mn,
0.36 to 3.65% of S,
not more than 10 mass % of Ni,
not more than 10 mass % of Mo,
and the balance of Fe and inevitable impurities in the overall composition, wherein the iron-based sintered alloy exhibits a metallic structure in which:
copper phases and pores are dispersed in a matrix that contains mainly a martensite structure,
sulfide particles mainly containing iron sulfide are precipitated and dispersed in grain boundaries, the pores, the matrix, and the copper phases, and
the sulfide particles are dispersed at 1 to 30 vol. % with respect to the matrix.
2. The iron-based sintered alloy for sliding member according to claim 1, wherein the copper phases are dispersed at 2 to 25 vol. % with respect to the matrix.
3. The iron-based sintered alloy according to claim 1, wherein the sulfide particles include copper sulfides and/or complex sulfides of iron and copper.
4. The iron-based sintered alloy according to claim 1, wherein the copper phases are dispersed at more than 5 vol. % and 25 vol. % or less with respect to the matrix.
5. A production method for the iron-based sintered alloy for a sliding member according to claim 1, the method comprising: preparing an iron powder, a copper powder, a graphite powder, and at least one sulfide powder of an iron sulfide powder and a copper sulfide powder, the iron powder consisting of 0.03 to 1.0 mass % of Mn and the balance of Fe and inevitable impurities; forming a raw powder by mixing the copper powder, the graphite powder, and the sulfide powder with the iron powder so as to consist of, by mass %, more than 15% and 30% or less of Cu, 0.2 to 2.0% of C, 0.03 to 0.9% of Mn, 0.36 to 3.65% of S, and the balance of Fe and inevitable impurities; compacting the raw powder into a green compact with a predetermined shape; sintering the green compact at a temperature of 1000 to 1200° C.; and quench hardening and tempering the sintered compact.

6. The production method for the iron-based sintered alloy for sliding member according to claim 5, wherein Ni or Mo is added in the form of an iron alloy powder by adding Ni or Mo to the iron powder, or Mo is added to the raw powder in the form of a nickel powder and a molybdenum powder in addition to or instead of the iron alloy powder, so that the raw powder further includes not more than 10 mass % of Ni or Mo.

* * * * *